(12) United States Patent
Park

(10) Patent No.: US 7,128,973 B2
(45) Date of Patent: Oct. 31, 2006

(54) EXPANDED POLYSTYRENE BEAD HAVING FUNCTIONAL SKIN LAYER, MANUFACTURING PROCESS THEREOF, AND FUNCTIONAL EPS PRODUCT AND MANUFACTURING PROCESS THEREOF USING THE SAME

(76) Inventor: Bong-Kuk Park, 101-1902 Boguk Wellrich, 205-1 Sinsang-ri, Jillyang-eup, Gyeonsan-si (KR) 712-731

( * ) Notice: Subject to any disclaimer, the term of this patent is extended or adjusted under 35 U.S.C. 154(b) by 0 days.

(21) Appl. No.: 10/523,888

(22) PCT Filed: Jan. 30, 2004

(86) PCT No.: PCT/KR2004/000182

§ 371 (c)(1),
(2), (4) Date: Feb. 4, 2005

(87) PCT Pub. No.: WO2005/073301

PCT Pub. Date: Aug. 11, 2005

(65) Prior Publication Data

US 2005/0266244 A1    Dec. 1, 2005

(51) Int. Cl.
- B32B 5/16 (2006.01)
- B05D 7/00 (2006.01)
- B05D 3/40 (2006.01)
- C08J 9/236 (2006.01)

(52) U.S. Cl. ............... 428/407; 264/121; 264/237; 264/300; 264/331.11; 427/222; 427/340

(58) Field of Classification Search ............ 264/121, 264/237, 331.11, 300; 428/403, 407; 427/222, 427/340

See application file for complete search history.

(56) References Cited

U.S. PATENT DOCUMENTS

| | | | | |
|---|---|---|---|---|
| 4,385,156 A | * | 5/1983 | Ingram et al. | 525/253 |
| 4,433,029 A | * | 2/1984 | Senda et al. | 428/407 |
| 4,519,964 A | * | 5/1985 | Rosen | 264/45.4 |
| 4,546,134 A | * | 10/1985 | Lakes | 524/141 |
| 5,786,398 A | | 7/1998 | Hulls et al. | 521/82 |
| 6,384,094 B1 | | 5/2002 | Gluck | 521/56 |

FOREIGN PATENT DOCUMENTS

| | | |
|---|---|---|
| JP | 55-29533 | 3/1980 |
| JP | 01-264979 | 10/1989 |
| KR | 20-0323680 | 8/2003 |
| WO | WO 91/14724 | 10/1991 |

OTHER PUBLICATIONS

PCT Written Opinion of the International Searching Authority (PCT/KR2004/000182) Dated: Oct. 25, 2004.
PCT International Search Report (PCT/KR2004/000182) Dated. Oct. 25, 2004.

* cited by examiner

Primary Examiner—H. Thi Le
(74) Attorney, Agent, or Firm—Cantor Colburn LLP

(57) ABSTRACT

Expanded polystyrene particles having a polyvinyl acetate resin-based functional skin layer, and a process thereof are provided. The particle includes an inner expanded polystyrene layer; and a functional skin layer. The inner expanded polystyrene layer is formed by heating and expanding an expandable polystyrene bead or pellet, and the functional skin layer is formed by coating the surface of the inner expanded polystyrene layer with a functional coating composition having 10 to 99 wt % of a vinyl acetate based polymer and 0.1 to 90 wt % of at least one functional additive.

13 Claims, 3 Drawing Sheets

EXPANDED POLYSTYRENE BEAD HAVING FUNCTIONAL SKIN LAYER, MANUFACTURING PROCESS THEREOF, AND FUNCTIONAL EPS PRODUCT AND MANUFACTURING PROCESS THEREOF USING THE SAME

TECHNICAL FIELD

The present invention relates to expanded polystyrene molded products having various functions, including flame-retardation, antibacterial properties, coloration properties, etc. More particularly, the present invention relates to (pre-) expanded polystyrene particles having a functional skin layer produced by coating the surface of (pre-) expanded polystyrene particles with a functional coating composition, a process for producing the expanded polystyrene particles, functional expanded polystyrene molded products manufactured using the expanded polystyrene particles with a functional skin layer, and a process for manufacturing the polystyrene molded products.

BACKGROUND ART

Expanded polystyrene is a polymer resin obtained by heating and curing the expandable polystyrene resin including expanding agent, such as pentane ($C_5H_{12}$) or butane ($C_4H_{10}$) in polystyrene resin or its copolymer resins, to generate foams therein. Expanded polystyrene is white in color, light in weight, and is superior in water resistance, thermal insulation properties, sound absorption and buffering properties. Due to these advantages, expanded polystyrene resin is widely used as a packaging material, a construction material, a material for floats, life jackets, decorative articles, insulators, living products, such as food containers and disposable products, and the like.

More detailed explanation regarding a molding process of expanded polystyrene products will be described below. A polystyrene or styrene copolymer resin containing an expanding agent in the shape of a bead having a diameter 0.2~0.3 mm or a pellet having a length of about 2.5 mm is pre-expanded to produce expanded particles (usually in the forms of beads). Thereafter, the expanded particles are aged and dried. The aged expanded particles are placed in a mold, heated with a high-pressure steam, and thus molded into a desired shape.

The expanded polystyrene thus produced contains 98 vol % of air and only about 2 vol % of the polymer resin. Further, the expanded polystyrene has a unique expanded structure in which air is enclosed by plastic foams. Based on this structure, since the expanded polystyrene is lightweight and shows superior buffering properties, thermal insulation properties, and sound absorption, it can be widely utilized in many applications.

However, since the expanded structure makes the expanded polystyrene more susceptible to some chemicals than the chemical resistance inherent to the polystyrene resin, the expanded structure is an obstacle in imparting a variety of functions upon the expanded polystyrene particles.

That is, the addition of functional components to expanded polystyrenes in order to impart additional functions to expanded polystyrene products presents difficulties that water resistance and heat resistance of the functional components, and moldability and chemical resistance of the expanded polystyrene must be comprehensively taken into account. Accordingly, functional expanded polystyrene molded products hitherto developed are very limited in the selection of the amount and kind of functional components within the range that does not affect physical and chemical properties during preparation of polystyrene.

Particularly, since expanded polystyrenes have relatively low melting point, and the molten polystyrene has low viscosity, molded products made of expanded polystyrene lose their structure and are melted easily by fire, thus being converted to a combustible liquid material. Under these circumstances, regulations including the Fire Services Act, in most developed countries, restrict the use of expanded polystyrenes, which prohibits the development of the expanded polystyrenes as construction materials.

In order to solve these problems, great efforts have been devoted to developing flame-retardant or fire-resistant expanded polystyrenes. For example, U.S. Pat. No. 6,384,094 discloses a process for preparing a fire-resistant expandable polystyrene by adding 1~12 wt % of an expandable graphite or an expanded graphite to a suspension containing a styrene monomer. In addition, the patent publication proves the usefulness of the expandable polystyrene thus prepared.

However, the expandable graphite begins to expand at about 900° C., whereas the polystyrene leaves 3 wt % of ash behind at 500° C. or above because of its extremely low heat resistance. The expandable graphite is expanded upon high-temperature heating to perform its thermal insulation, but the graphite loses its structure due to the absence of a material capable of binding the graphite, resulting in poor fire resistance.

On the other hand, Korean Utility Model No. 323680 describes a flame-retardant expanded polystyrene panel manufactured by coating an aqueous sodium silicate solution on the surface of an expanded polystyrene particle, and irradiating microwaves to the coating to heat-bond the sodium silicate to the polystyrene. This technology has disadvantages in that the coating of the sodium silicate is poor in water resistance and expensive equipment is required for the microwave irradiation.

DISCLOSURE OF THE INVENTION

Therefore, the present invention has been made in view of the above problems, and it is an object of the present invention to provide an expanded polystyrene that can be produced using conventional molding equipment without the need for additional expensive equipment and developed into various functional products superior in flame retardation, fire resistance, antibacterial properties, waterproofness, aromatic properties, coloration properties, etc.

The object of the present invention can be achieved by coating the surface of expanded polystyrene particles with a functional coating composition to form a functional skin layer inside the particles, followed by molding. The functional coating composition used herein contains at least one functional additive, and a polyvinyl acetate resin with high affinity to the expanded polystyrene particles and low-temperature melt bonding property so as to be suitable for steam molding.

In accordance with one aspect of the present invention, there are provided expanded polystyrene particles consisting of an inner expanded polystyrene layer and a functional skin layer wherein the inner expanded polystyrene layer is formed by heating and expanding expandable polystyrene beads or pellets, and the functional skin layer is formed by coating the surface of the inner expanded polystyrene layer with a functional coating composition containing 10~99 wt % of a vinyl acetate based polymer and 0.1~90 wt % of at least one functional additive.

In accordance with another aspect of the present invention, there is provided a process for producing the expanded polystyrene particles with a functional skin layer, comprising the steps of:

heating and expanding expandable polystyrene beads or pellets to produce expanded polystyrene particles;

applying a functional coating composition to the surface of the expanded polystyrene particles, the functional coating composition being prepared by mixing or dissolving at least one functional additive with a vinyl acetate based polymer solution to form a functional skin layer; and adding a release agent to the expanded polystyrene particles whose surface is coated with the functional coating composition, to separate the expanded polystyrene particles having the functional skin layer into individual particles, and drying the separated particles.

In accordance with another aspect of the present invention, there is provided a process for manufacturing the functional expanded polystyrene molded product comprising the steps of introducing the expanded polystyrene particles having a functional skin layer into a molder, and applying high-pressure steam to the molder to bond the expanded polystyrene particles with each other.

In accordance with yet another aspect of the present invention, there is provided a functional expanded polystyrene molded product made of the expanded polystyrene particles with functional skin layer according to the present invention.

A more detailed explanation concerning the structure of the expanded polystyrene particles having a functional skin layer according to the present invention will be given below. The expanded polystyrene particles having a functional skin layer are spherical particles having a skin-core structure wherein the overall diameter of the expanded polystyrene particles is between about 1 mm and about 30 mm, the diameter of the expanded polystyrene particles constituting the inner core layer is between about 0.999 mm and about 29.999 mm, and the thickness of the outer skin layer is between about 1 μm and about 100 μm. The expanded polystyrene particles constituting the core layer account for 5~99 wt %, the functional skin layer accounts for 1~95 wt %, and other residues account for 5 wt % or less, based on the total weight of the expanded polystyrene particles.

The expanded polystyrene particles constituting the core layer include those previously known in the art. The components and production processes are as explained in the above prior art.

On the other hand, the functional skin layer is formed by coating the surface of expanded polystyrene particles with a functional coating composition containing a vinyl acetate based polymer solution and at least one functional additive, followed by separating (to individual particles) and drying. The vinyl acetate based polymer solution is prepared by dissolving 3~80 wt % of a vinyl acetate based polymer in a solvent. The vinyl acetate based polymer can be a vinylacetate homopolymer, or a copolymer of vinyl acetate and at least one monomer selected from: vinyl esters, such as vinyl caproate and vinyl stearate; acrylic esters, such as ethyl acrylate, butyl acrylate and octyl acrylate; fumaric acid esters, such as dibutyl maleate; carboxylic acids, such as maleic acid, acrylic acids and itaconic acid; vinyl alcohols; butadienes; and caprolactones; or a mixture or a blend thereof. The vinyl acetate based polymer has a degree of polymerization (DP) of 10~100,000. It is preferred that the content of the vinyl acetate monomer in the vinyl acetate based polymer is 55% or more.

Examples of suitable solvents to prepare the vinyl acetate based polymer solution include water, and organic solvents such as alcohols, esters, ketones, carboxylic acids, aromatics, and halogenated hydrocarbons. It is preferred to select a solvent having relatively high volatility and reduced human toxicity, particularly, minimally dissolving or eroding the surface of expanded polystyrene particles. In this respect, alcohols are preferred. The concentration of the resin component is determined within the range defined above, taking into account the adhesion to the surface of the expanded polystyrene particles and workability upon handling.

The functional additive can be added for intended functions without particular limitations so long as it is readily dissolved or dispersed in the vinyl acetate based polymer solution and does not erode or dissolve the surface of the expanded polystyrene particles. Examples of such additives include expanding agents, nucleating agents, lubricants, antioxidants, heat stabilizers, ultraviolet stabilizers, biostabilizers, fillers, reinforcing agents, plasticizers, colorants, impact-resistant agents, flame retardants, antistatic agents, cross-linking agents, fluorescent whitening agents, thermal conductivity-imparting agents, electrical conductivity-imparting agents, permeability modifiers, magnetism-imparting agents, surfactants, stabilizers, excipients, drugs, solvents, hardeners, desiccants, fortifying agents, flavoring agents, antibacterial agents, etc. These additives may be added alone or in combination as a mixture of two or more agents compatible with each other.

In particular, when a flame retardant, such as antimony trioxide, a phosphoric compound, boron, boric acid or aluminum oxide, is added, a kind of fire wall surrounding the surface of the expanded polystyrene particles is built, which prevents the spread of a fire to sites not directly reached by the flame and maintains the overall shape of the skin layer acting as a skeleton unchanged, leading to a very effective flame-retardant expanded polystyrene product.

The vinyl acetate based polymer solution containing the functional additive is uniformly applied to the surface of the expanded polystyrene particles. At this step, if the viscosity of the polymer solution is low, it is advantageous to stir the expanded polystyrene particles while the polymer solution is sprayed on the surface of the particles. Meanwhile, if the polymer solution is highly viscous, the expanded polystyrene particles can be mixed with the polymer solution in a mixer with stirring to apply the polymer solution to the surface of the particles.

The application of the vinyl acetate based polymer solution containing the functional additive to the expanded polystyrene particles may cause the polystyrene particles to be agglomerated due to the viscosity of the polymer solution, which makes it difficult to manufacture a molded product from the expanded polystyrene particles. Therefore preferably, the polymer solution is uniformly applied to the surface of the expanded polystyrene particles, followed by the steps of separating and drying, to produce the final expanded polystyrene particles having the functional skin layer.

As the release agent used for separating, there may be used a liquid material or a solid powder different from the solvent used to prepare the vinyl acetate based polymer solution. When the solid powder is used, the moldability of the expanded polystyrene particles is degraded and dust is created during drying. When the liquid material is too lipophilic, it is more compatible with the polystyrene than with the vinyl acetate based polymer, causing the separation of the polystyrene from vinyl acetate based polymer. Accordingly, the use of excessively lipophilic liquid materials should be avoided. Thus, preferred release agent should be more or less hydrophilic liquid type material such that it can be uniformly applied to the exterior surface of the vinyl acetate based polymer, and should remain until the solvent of the polymer solution is appropriately removed such that it can. Examples of suitable release agents include, but are not limited to, hydrophilic liquid materials, such as water, ethylene glycol and glycerin, containing two or more hydroxyl groups (—OH) in their molecular structure, and silicone oils. These release agents can be used alone or as a mixture of two or more thereof. The release agent is used in an amount of 1~40 wt % of the vinyl acetate based polymer. The amount of the release agent used is properly selected depending on the surface area of the expanded polystyrene particles and the kind of the functional coating composition constituting the skin layer.

After the release agent is uniformly added, the mixture is dried with stirring to separate the expanded polystyrene particles into individual particles. Drying is carried out in hot air at 100° C. or lower with stirring. Alternatively, the drying may be carried out in a drier at 100° C. or lower with stirring, or may be carried out under reduced pressure. For better workability, a combination of vacuum drying and heating is most effective.

The functional skin layer thus formed contains 10~99 wt % of the vinyl acetate based polymer, 0.1~90 wt % of the functional additive, and 20 wt % or less of residues of the solvent and the release agent. The content of the functional additives is greatly dependent on functions to be imparted. For example, flame-retardants, reinforcing agents and fillers are added in large amounts, but colorants can attain desired effects using only small amounts. Within the range defined above, the vinyl acetate based polymer can serve as a matrix capable of forming the skin layer.

The expanded polystyrene particles having the functional skin layer are stored in a silo before use. For use, the expanded polystyrene particles are taken out of the silo, placed in a mold having a desired shape, and molded using high-pressure steam to manufacture a functional expanded polystyrene molded product. This molding may be performed in accordance with the same procedure as conventional molding processes of expanded polystyrenes.

BRIEF DESCRIPTION THE DRAWINGS

The above and other objects, features and other advantages of the present invention will be more clearly understood from the following detailed description taken in conjunction with the accompanying drawings, in which.

BEST MODE FOR CARRYING OUT THE INVENTION

The present invention will now be described in more detail with reference to the following several examples of the manufacture of functional expanded polystyrene molded products.

EXAMPLE 1

Manufacture of Flame-Retardant Expanded Polystyrene Molded Product

A. Preparation of Flame-Retardant Polyvinyl Acetate Solution (A1)

450 g of a polyvinyl acetate resin having a degree of polymerization of 500 was uniformly dissolved in 550 g of methanol to prepare 1 kg of polyvinyl acetate solution. To the polymer solution was added 1 kg of aluminum hydroxide particles having an average particle size of 7.5 µm. The resulting mixture was uniformly dispersed to prepare 2 kg of a methanolic polyvinyl acetate solution (A1) containing the flame-retardant additive.

B. Coating on Expanded Polystyrene Particles

Expandable polystyrene particles were expanded to an average of 80 fold, and dried. 2 kg of the expanded polystyrene particles were charged into a 200-liter ribbon mixer. 2 kg of the flame-retardant polyvinyl acetate polymer solution (A1) prepared in step A was added to the expanded polystyrene particles with stirring at 50 rpm for one minute to uniformly coat the expanded particles, yielding 4 kg of expanded polystyrene particles whose surface was coated with the flame-retardant polyvinyl acetate polymer solution.

C. Drying, Separating and Production of Expanded Polystyrene Particles Having Flame-Retardant Skin Layer Stirring was continued for about 10 seconds while applying hot air at 60° C. to the ribbon mixer. Then, 50 g of ethylene glycol was sprayed with stirring to allow the expanded polystyrene particles coated with the flame-retardant polyvinyl acetate polymer solution to separate into individual particles. The separated particles were dried with stirring for 3 minutes to produce expanded polystyrene particles (C1) having a flame-retardant skin layer.

D. Production of Flame-Retardant Expanded Polystyrene Molded Product

The expanded polystyrene particles (C1) having a flame-retardant skin layer produced in step C were put in a steam molder for EPS, heated at a steam pressure of 0.6 kg/cm$^3$ for 50 seconds, sustained for 10 seconds, and cooled to manufacture a flame-retardant expanded polystyrene molded product (D1) having a density of 35 kg/m$^3$.

E. Observation of Skin-Core Structure

Figure 1:
FIG. 1 is an electron micrograph (30×) showing a cutaway portion of the surface of an expanded polystyrene particle (C1) having a flame-retardant skin layer produced in Example 1 of the present invention.

For observation of the skin-core structure of the expanded polystyrene particles having a flame-retardant skin layer produced in step C, one particle (C1) of the expanded polystyrene particles was selected. A portion of the surface of the particle (C1) was cut, and then the cutaway portion was observed under an electron microscope with a magnification of 30× (see FIG. 1). This observation reveals that the expanded polystyrene particle (C1) produced in this example is a spherical particle having an expanded structure completely coated with the flame-retardant skin layer.

Figure 2:
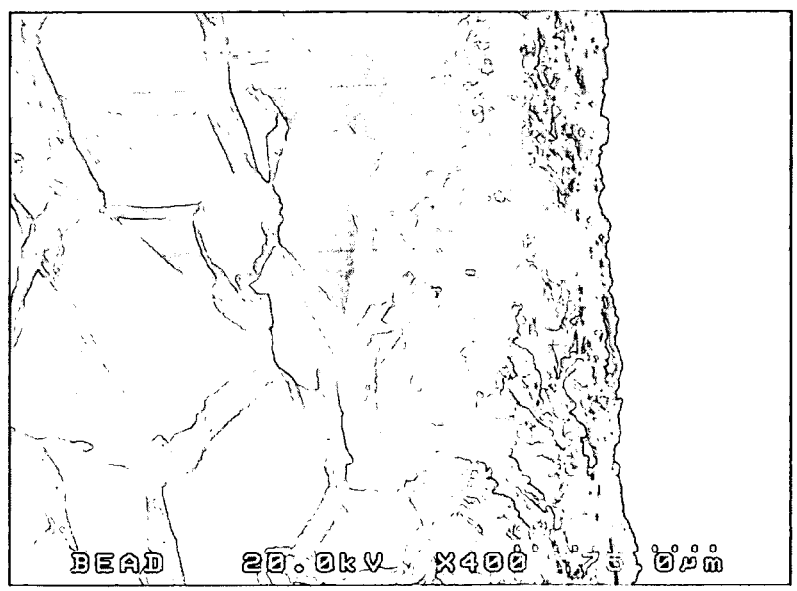
FIG. 2 is an electron micrograph (400×) showing an interface between a skin layer and a core layer of the cutaway portion shown in FIG. 1.

A higher magnification (400×) of the interface between the skin layer and the core layer of the expanded polystyrene particle (C1) is shown in FIG. 2. As shown in FIG. 2, the skin layer was completely adhered to the inner expanded polystyrene layer.

F. Flame-Retardation Test

Figure 3:
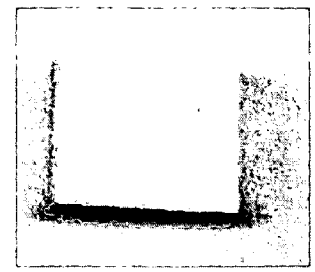
FIG. 3 is a photograph showing the initial state of a sample for a flame-retardation test, produced in Example 1 of the present invention.

The flame-retardant expanded polystyrene molded product D1 manufactured in step D was cut into a plate-shaped sample having dimensions of 2 cm (1)×2 cm (w)×1 cm (h) (see FIG. 3), which was used for the flame-retardation test.

Figure 4:
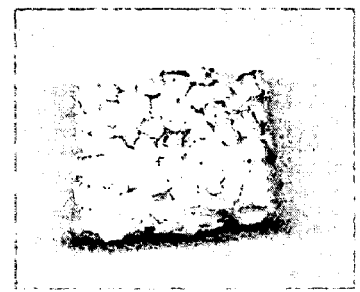
FIGS. 4 and 5 are front and side photographs taken after the flame-retardation test for the sample shown in FIG. 3, respectively.
Figure 5:

The sample was exposed to a 4 cm high flame from a Bunsen burner for 30 seconds to conduct a flame-retardation test, and the obtained results are shown in FIGS. 4 and 5.

As shown in FIGS. 4 and 5, only a portion of the expanded polystyrene particles exposed to the surface were collapsed by heating, but heat and flame were blocked by means of the skin layer and the skeleton of the molded product (D1) was maintained, confirming that the original structure of the molded product (D1) was unchanged.

EXAMPLE 2

Manufacture of Antibacterial Expanded Polystyrene Molded Product

A. Preparation of Antibacterial Polyvinyl Acetate Solution 450 g of a polyvinyl acetate resin having a degree of polymerization of 500 was uniformly dissolved in 550 g of methanol to prepare 1 kg of a polyvinyl acetate solution, and then 0.2 kg of ethyl paraben was added thereto. The resulting mixture was completely dissolved with stirring for one hour to prepare 1.2 kg of a methanolic polyvinyl acetate solution (A2) containing the antibacterial additive.

B. Coating on Expanded Polystyrene Particles 2.5 kg of expanded polystyrene particles coated with the antibacterial polyvinyl acetate solution were produced in the same manner as in Example 1 (B), except that 0.5 kg of the antibacterial polyvinyl acetate solution (A2) prepared in step A was added instead of the flame-retardant polyvinyl acetate solution (A1).

C. Drying, Separating and Preparation of Expanded Polystyrene Particles Having Antibacterial Skin Layer Drying and separating were carried out in the same manner as in Example 1 to produce expanded polystyrene particles (C2) having an antibacterial skin layer.

D. Manufacture of Antibacterial Expanded Polystyrene Molded Product

The expanded polystyrene particles (C2) having an antibacterial skin layer produced in step C were charged into a steam molder for EPS, heated at a steam pressure of 0.6 kg/cm$^3$ for 40 seconds, sustained for 10 seconds, and cooled to manufacture an antibacterial expanded polystyrene molded product (D2) having a density of 15 kg/m$^3$.

E. Antibacterial Performance Test

A portion of the antibacterial expanded polystyrene molded product D2 manufactured in step D was ground. After 0.4 g of the ground molded product and a test bacterial solution in which *Staphylococcus aureus* was incubated were subjected to shaking culture at a shaking frequency of 150 cycles per minute at 35° C. for 24 hours, the number of the bacteria was counted and the bacterial decrease rate (bacteriostatic rate) was determined.

Figure 6:
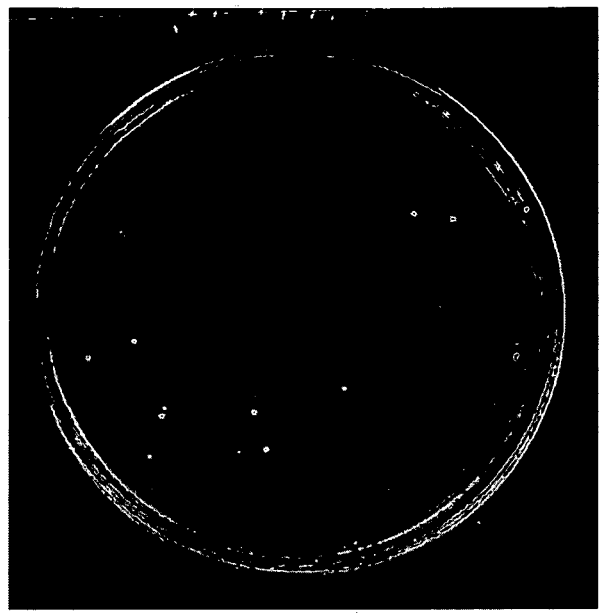
FIG. 6 is a photograph showing the results of an antibacterial performance test for an expanded polystyrene molded product manufactured in Example 2 of the present invention.

After the shaking culture, the initial bacterial concentration ($1.3 \times 10^5$ count/ml) of the test bacterial solution was decreased to 10 count/ml (FIG. 6).

As apparent from the results shown in FIG. 6, the antibacterial test performed by the shake-flask method confirms a bacterial decrease of 99.9% in the antibacterial expanded polystyrene molded product D2 produced in this example.

EXAMPLE 3

Manufacture of Aesthetic Expanded Polystyrene Molded Product

A. Preparation of Colored Polyvinyl Acetate Solution 25 g of a polyvinyl acetate resin having a degree of polymerization of 500 was uniformly dissolved in 475 g of methanol to prepare 0.5 kg of a polyvinyl acetate solution. 10 g of a black pigment was added to the polymer solution, and was completely dissolved with stirring for one hour to prepare 0.51 kg of a methanolic black-colored polyvinyl acetate solution (A3).

B. Coating on Expanded Polystyrene Particles 2.51 kg of expanded polystyrene particles coated with the colored polyvinyl acetate polymer solution were prepared in the same manner as in Example 1 (B), except that 0.51 kg of the colored polyvinyl acetate polymer solution (A3) prepared in step A was added instead of the flame-retardant polyvinyl acetate solution (A1).

C. Drying, Separating, and Production of Expanded Polystyrene Particles Having Colored Skin Layer Expanded polystyrene particles (C3) having a black skin layer were produced in the same manner as in Example 1 (C), except that 250 g of water was used instead of ethylene glycol.

D. Manufacture of Aesthetic Expanded Polystyrene Molded Product

The expanded polystyrene particles (C3) having a black skin layer produced in step C were charged into a steam molder for EPS, heated at a steam pressure of 0.6 kg/cm$^3$ for 40 seconds, sustained for 10 seconds, and cooled to manufacture an aesthetic expanded polystyrene molded product (D3) having a density of 15 kg/m$^3$.

Figure 7:
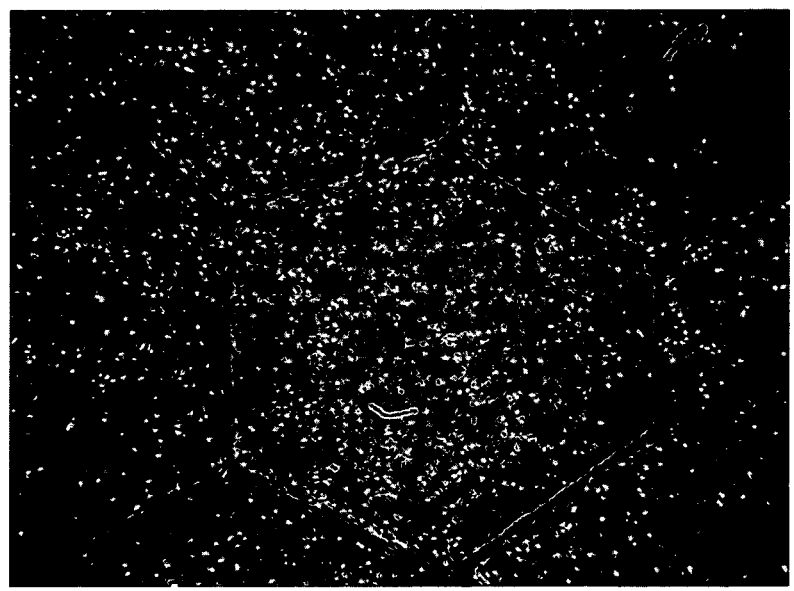
FIG. 7 is an enlarged photograph showing the cross section of an aesthetic expanded polystyrene molded product manufactured in Example 3 of the present invention.

E. Observation of Cross Section of Aesthetic Expanded Polystyrene Molded Product The surface of the expanded polystyrene molded product D3 manufactured in step D was wholly black-colored. A 5 cm deep piece was cut from the expanded polystyrene molded product D3, and then the cross section of the piece was observed under a microscope. The photograph is shown in FIG. 7.

As apparent from the photograph, the cross section of the expanded polystyrene molded product (D3) had a slightly irregular shape similar to a honeycomb wherein the black-colored skin layer was formed between the white expanded polystyrene particles.

In the case of a commercial block molding product manufactured by cutting the block-shaped molded product to a desired thickness, the size and color of the expanded polystyrene particles, and the color of the skin layer are varied, making it possible to manufacture aesthetic expandable polystyrene panels exhibiting various color effects.

INDUSTRIAL APPLICABILITY

As apparent from the above description, according to the expanded polystyrene particles of the present invention, inherent properties of expanded polystyrene, e.g., light weight, thermal insulation properties, shape stability, buffering properties and sound absorption, are ensured by the expanded polystyrene particles constituting the core layer, and at the same time, superior low-temperature bonding properties, air-tightness, waterproofness and durability are provided by the low-softening point vinyl acetate based polymer constituting the skin layer.

In addition, superior adhesion of the vinyl acetate based resin to polystyrene, and relatively good low-temperature adhesion properties of the vinyl acetate based polymer enable improvement of the physical properties, e.g., compressive strength, tensile strength and flexural strength, of the molded products of the present invention. Optionally, various functional additives, including flame retardants, water repellents, antibacterial agents, colorants, flavoring agents, etc., can be added to the vinyl acetate based polymer to impart a variety of functions to the expanded polystyrene particles of the present invention in a simple manner. Therefore, the expanded polystyrene particles of the present invention can be applied to manufacture of lightweight industrial materials, particularly construction materials, with various functions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An expanded polystyrene particle with a functional skin layer comprising:
    an inner expanded polystyrene layer; and
    a functional skin layer,
    wherein the inner expanded polystyrene layer is formed by heating and expanding an expandable polystyrene bead or pellet, and the functional skin layer is formed by coating the surface of the inner expanded polystyrene layer with a functional coating composition having 10 to 99 wt % of a vinyl acetate based polymer and 0.1 to 90 wt % of at least one functional additive.

2. The expanded polystyrene particle with functional skin layer according to claim 1, wherein the vinyl acetate based polymer includes a vinylacetate homopolymer, or a copolymer of vinyl acetate and at least one monomer selected from a group of consisting of vinyl esters, acrylic esters, fumaric acid esters, carboxylic acids, vinyl alcohols, butadienes, caprolactones, and a mixture or a blend thereof, and
    wherein the vinyl acetate based polymer has a degree of polymerization (DP) of 10 to 100,000.

3. The expanded polystyrene particle with functional skin layer according to claim 1, wherein the functional skin layer has a thickness corresponding to 0.003 to 10% of the overall diameter of the particle, and has 1 to 95 wt % of the total weight of the particle.

4. The expanded polystyrene particle according to claim 1, wherein the functional additive is selected from the group consisting of expanding agents, nucleating agents, lubricants, antioxidants, heat stabilizers, ultraviolet stabilizers, biostabilizers, fillers, reinforcing agents, plasticizers, colorants, impact-resistant agents, flame retardants, antistatic agents, crosslinking agents, fluorescent whitening agents, thermal conductivity-imparting agents, electrical conductivity-imparting agents, permeability modifiers, magnetism-imparting agents, surfactants, stabilizers, excipients, drugs, solvents, hardeners, desiccants, fortifying agents, flavoring agents, antibacterial agents, and mixtures thereof.

5. A functional expanded polystyrene molded product manufactured by molding the expanded polystyrene particle with functional skin layer according to claim 1.

6. A process for producing expanded polystyrene particles with functional skin layer, comprising:
    heating and expanding expandable polystyrene beads or pellets to produce expanded polystyrene particles;
    applying a functional coating composition to the surface of the expanded polystyrene particles, the functional coating composition being prepared by mixing or dissolving at least one functional additive with a vinyl acetate based polymer solution to form a functional skin layer; and
    adding a release agent to the expanded polystyrene particles whose surface is coated with the functional coating composition, to separate the expanded polystyrene particles having the functional skin layer into individual particles, and drying the separated particles.

7. The process according to claim 6, wherein the solvent used to prepare the vinyl acetate based polymer solution is water, or an organic solvent selected from alcohols, esters, ketones, carboxylic acids, aromatics, and halogenated hydrocarbons, or mixtures thereof.

8. The process according to claim 6, wherein the vinyl acetate based polymer solution includes 3 to 80 wt % of a vinyl acetate based polymer based on the total weight of the vinyl acetate based polymer solution.

9. The process according to claim 6, wherein the release agent includes hydrophilic liquid materials having two or more hydroxyl groups (—OH) in their molecular structure, silicone oils, or mixtures thereof.

10. The process according to claim 9, wherein the hydrophilic liquid materials includes water, ethylene glycol or glycerin.

11. A process for manufacturing a functional expanded polystyrene molded product, comprising:
    introducing the expanded polystyrene particles with functional skin layer produced by the process according to claims 6 into a steam molder;
    applying high-pressure steam to the molder to bond the expanded polystyrene particles with functional skin layer to each other through their functional skin layer; and
    cooling the bonded expanded polystyrene particles.

12. The expanded polystyrene particle with functional skin layer according to claim 2, wherein the vinyl esters includes vinyl caproate or vinyl stearate, the acrylic esters includes ethyl acrylate, butyl acrylate or octyl acrylate, the fumaric acid esters includes dibutyl maleate, the carboxylic acids includes maleic acid, acrylic acids, or itaconic acid.

13. The expanded polystyrene particle with functional skin layer according to claim 2, wherein the content of the vinyl acetate monomer in the vinyl acetate based polymer is 55 mol % or more.

* * * * *